US008123485B2

(12) United States Patent
Quell

(10) Patent No.: US 8,123,485 B2
(45) Date of Patent: Feb. 28, 2012

(54) ROTOR HUB OF A WIND ENERGY PLANT

(75) Inventor: Peter Quell, Osterronfeld (DE)

(73) Assignee: Repower Systems AG, Hamburg (DE)

( * ) Notice: Subject to any disclaimer, the term of this patent is extended or adjusted under 35 U.S.C. 154(b) by 581 days.

(21) Appl. No.: 12/307,235

(22) PCT Filed: Jun. 14, 2007

(86) PCT No.: PCT/EP2007/005263
§ 371 (c)(1),
(2), (4) Date: Dec. 31, 2008

(87) PCT Pub. No.: WO2008/003389
PCT Pub. Date: Jan. 10, 2008

(65) Prior Publication Data
US 2009/0317256 A1     Dec. 24, 2009

(30) Foreign Application Priority Data
Jul. 3, 2006 (DE) .......................... 10 2006 031 174

(51) Int. Cl.
*F03D 11/04* (2006.01)
(52) U.S. Cl. ..... 416/211; 416/174; 416/202; 416/204 R; 416/210 R; 416/248
(58) Field of Classification Search .................. 416/174, 416/202, 204 R, 210 R, 211, 248
See application file for complete search history.

(56) References Cited

U.S. PATENT DOCUMENTS

| 6,942,461 B2 | 9/2005 | Wobben | |
|---|---|---|---|
| 7,470,111 B2 | 12/2008 | Schubert | |
| 2006/0067827 A1* | 3/2006 | Moroz | 416/204 R |

FOREIGN PATENT DOCUMENTS

| CN | 1446289 | | 10/2003 |
|---|---|---|---|
| DE | 10201726 A1 | | 8/2003 |
| DE | 102004023773 B3 | | 11/2005 |
| EP | 1303698 B1 | | 4/2003 |
| WO | 01/42647 | | 6/2001 |
| WO | WO 01/42647 | * | 6/2001 |
| WO | 02/06667 | | 1/2002 |
| WO | 03/060319 | | 7/2003 |
| WO | WO 03/060319 | * | 7/2003 |
| WO | 2004/090326 | | 10/2004 |

* cited by examiner

*Primary Examiner* — Zandra Smith
*Assistant Examiner* — Jamie C Niesz
(74) *Attorney, Agent, or Firm* — Rankin, Hill & Clark LLP

(57) ABSTRACT

A rotor hub (10) of a wind power plant for a rotor, in particular with at least one rotor blade is provided, wherein a hub core body (12) and at least one hub outer body (16) are connected together by means of a flange connection (18). The rotor hub (10) is further characterized in that the flange connection (18) is constructed with a predetermined tilt angle (α) towards the rotational axis (24) of the rotor, wherein the tilt angle (α) of the flange connection (18) is constructed larger than the tilt angle (α) of the rotor blade connection surface of the hub outer body (16). Furthermore, a wind power plant may be provided with the rotor hub (10).

22 Claims, 1 Drawing Sheet

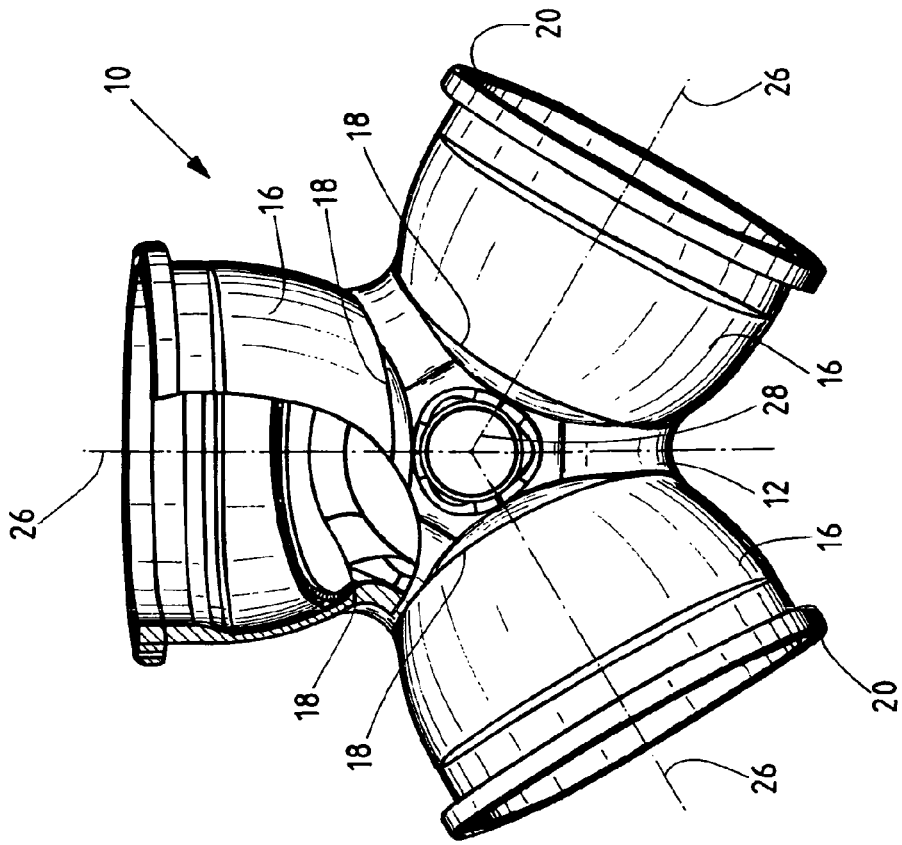
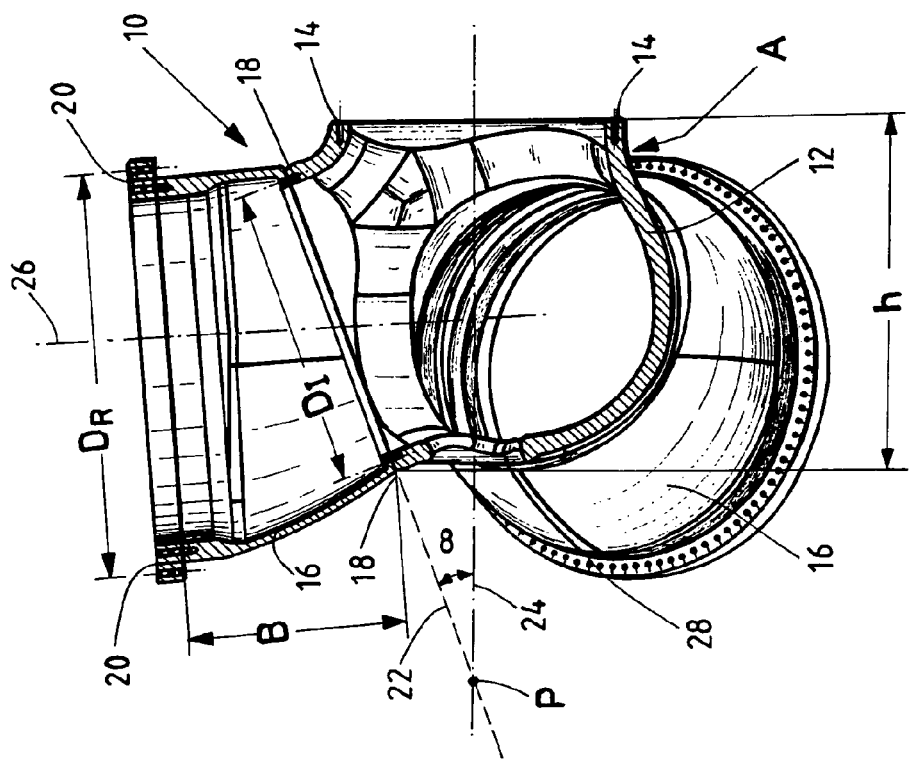
FIG. 1
FIG. 2

ROTOR HUB OF A WIND ENERGY PLANT

BACKGROUND OF THE INVENTION

1. Field of the Invention

The invention relates to a rotor hub of a wind power plant for a rotor, in particular with at least one rotor blade, wherein a hub core body and at least one hub outer body are connected together. Furthermore, the invention relates to a wind power plant with a rotor hub.

2. Description of Related Art

In wind power plants, a rotor blade is fastened in a pivotable manner on a rotor hub with a blade bearing. Known wind power plants consist of a tower, a nacelle arranged on the upper end of the tower, a rotor that is pivot-mounted around a rotor axis on the outside of the nacelle and that has a rotor hub and at least one rotor blade extending from the rotor hub. A generic wind power plant is for example described in DE-A-10 2004 023 773, which has a rotor hub with a blade adjustment system.

EP-B-1 303 698 also discloses a rotor hub of a wind power plant. The rotor hub establishes a mechanical connection between the rotor shaft or the rotor axis and the rotor blades.

Starting from this state of the art, the object of the present invention is to provide a rotor hub that can be produced and installed easily and cost-effectively, wherein it should be possible to transport larger rotor hubs in an efficient manner.

BRIEF SUMMARY OF THE INVENTION

This object is solved through a rotor hub of a wind power plant for a rotor, in particular with at least one rotor blade, wherein a hub core body and at least one hub outer body are connected together by means of a flange connection, which is further established in that the flange connection is constructed with a predetermined tilt angle towards the rotational axis of the rotor, wherein the tilt angle of the flange connection is constructed larger than the tilt angle of the rotor blade connection surface of the hub outer body.

In particular, a multi-part rotor hub is provided, which is formed in the fully installed state, e.g. on a nacelle of a wind power plant, from a separate hub core body and at least one or more separate hub outer bodies. It is possible within the framework of the invention that a rotor blade is already provided or designed with a hub outer body.

The invention is based on the idea that in the case of a hingeless rotor or a rigid rotor hub of a wind power plant, in which a rigid connection of the rotor blades with the rotor axis or shaft occurs via the hingeless or rigid rotor hub, a flange connection is provided, which is arranged in a connection plane and assumes a predetermined angle with the rotational axis of the rotor or the rotor shaft. In the geometric sense, the rotor axis breaks through the plane in which the planar connection surface of the connection flange or the flange connection between the hub core body and the hub outer body lies. For this, the flange connection between the hub core body, which will be or is connected with the rotor shaft, and the hub outer body between the hub core body and the rotor blade arranged on it, is preferably designed as a planar connection surface.

Compared to the previous connections of the connection body between the outer rotor blade and the hub core body, the plane, in which the flange connection between the core body and the connection body is arranged, is designed tilted. In the case of the previous connections, the connection planes of the flange and the rotor axis are aligned parallel to each other so that they cannot touch or cut each other. Moreover, in other known connections, according to the state of the art, the connection planes for rotor blades are tilted towards the rotational axis with a tilt angle in the range of 3°. According to the invention, this tilt angle of the connection plane of the rotor blades is smaller than the tilt angle of the connection surface between the hub core body and the hub outer body or bodies.

In accordance with the invention, a rotor hub of a wind power plant is provided, which has a hub core body as the rotor hub body, wherein the hub core body will be or is connected with a rotor shaft. The hub core body also has at least one flange connection, the surface of which is tilted towards the rotational axis of the rotor shaft at a predetermined angle. It should also be noted that, according to the invention, the surface of the flange connection is arranged at a predetermined, non-right angle to the rotor blade axis of a rotor blade.

The hub core body connects the rotor hub as the central piece with the rotor shaft. The connection bodies or hub outer bodies are arranged on the flange connection, arranged tilted towards the rotation axis of the rotor so that the rotor blades can be or are mounted on it.

Due to the diagonally tilted or designed flange connections running towards the rotor axis, it is possible to design a separable, i.e. multi-part, rotor hub so that the transport of individual parts of the rotor hub, e.g. the hub core body and/or hub outer body, is thereby facilitated. The individual transported parts of the rotor hub are then put together at the installation location of a wind power plant and are connected together for example with the help of screw connections via the flange connections. In accordance with the invention, it is thus possible to transport for example rotor hubs with flange connections that are 3 m to 6 m in diameter after production to the installation location without problems.

In accordance with an alternative solution of the object or in another embodiment, it is provided that the height of the hub core body is smaller than the diameter of the, in particular circular or round, rotor blade connection surface of the hub outer body, wherein in particular the flange connection between the hub core body and the hub outer body is advantageously designed in a circular or round manner. It is thereby possible to provide a multipart rotor hub, which due to the lower height of the hub core body compared to the, preferably circular, blade flange diameter of the hub outer body permits a simple transport of the hub core body, since the height of the hub core body can be considered the transport height of the hub core body. For example, a hub core body with a connection diameter of the ring flange on the rotor shaft side of 3 m and a height of less than 4 m can, thus, be transported on a transport vehicle, wherein a rotor blade with a (round) blade flange diameter of more than 4 m can be attached to the fully installed rotor hub with hub core body and at least one hub outer body. For example, the height of the hub core body between 0.5 m to 2.5 m is smaller than the blade flange diameter.

In a preferred embodiment, the flange connection between the hub core body and the hub outer body is designed in a circular, i.e. round, manner. This also has the advantage that, due to the round connection point in the area of the flange connection, a more fixed connection is established between the hub body and the connection body attached to it during installation, since more screws are distributed around the circular flange circumference compared to an oval flange circumference. There are also numerous advantages during production.

In order to provide a rotor that has several rotor blades, it is also provided that several flange connections are designed on the rotor hub between the hub core body and several hub rotor blade connection bodies.

It is also advantageously provided that the flange connections are arranged or provided regularly on the hub core body.

In particular, the or each hub outer body is connected with a rotor blade. In the case of a wind power plant with a rotor, which has several rotor blades, the connection bodies are each connected with a rotor blade.

It is also beneficial if the hub outer body and the hub core bodies are permanently connected with each other.

In order to make it possible for maintenance personnel to access the rotor, an access opening is also provided on the hub core body. Within the framework of the invention, another access opening can also be provided on another point of the rotor or nacelle.

In particular, the access opening is designed in the area of the rotor axis on the hub core body. It is also conceivable that the access opening is provided on another point of the rotor hub.

For the fastening of rotor blades on the rotor hub, the hub outer body on the rotor blade side has a flange connection so that a rotor blade is fastened or arranged on it. The flange connection is also called a rotor blade flange or blade flange.

The rotor-blade-side flange connection is preferably designed in a circular manner in order to establish a reliable connection between the rotor blade and the respective connection body and to enable simple pitch control of the rotor blade by means of a round blade bearing.

Furthermore, according to a preferred embodiment of the rotor hub according to the invention, it is suggested that the diameter of the rotor-blade-side flange connection of the hub outer body is larger than the diameter of the, in particular circular, hub-core-body-side flange connection. This results in optimized conditions with respect to the stiffness, the weight, and the dimensions of a hub core body or a rotor hub according to the invention. Easy transport is hereby possible for large rotor hubs, to which rotor blades e.g. with a blade flange diameter greater than 4 m are attached, since the transport height or height of the hub core body is smaller than the blade flange diameter.

The object is also solved through a wind power plant, which is provided with a separated or separable rotor hub according to the invention with connection surfaces tilted towards the rotational axis. In order to avoid repetitions, reference to the above explanations is made expressly.

The invention is described below, without restricting the general intent of the invention, based on an exemplary embodiment, wherein reference to the drawings is made with regard to the disclosure of all details according to the invention that are not explained in greater detail in the text.

BRIEF DESCRIPTION OF THE DRAWINGS

FIG. 1 shows a cross-section through a rotor hub according to the invention and

FIG. 2 shows a view from the top of the rotor hub according to the invention in accordance with FIG. 1.

DETAILED DESCRIPTION OF THE INVENTION

In the following figures, the same or similar types of elements or corresponding parts are provided with the same reference numbers, in order to prevent the item from needing to be reintroduced.

FIG. 1 shows a cross-section of a rotor hub 10. The rotor hub 10 has a hub core body 12, which is connected with the rotor shaft of the wind power plant (not shown) via a ring flange 14. Based on the cross-sectional representation, FIG. 1 shows the connection of the hub core body 12 with a hub outer body 16. The ring flange 14 typically has a diameter of e.g. 3 m for a wind power plant with a power of 8 to 12 megawatts.

FIG. 1 also shows the height h of the hub core body 12, which is, for example, less than 4 m. The height h is an important variable for the trans-port of the hub core body 12 since the transport height of a transport vehicle is determined by it. A simple transport over normal streets is possible without problem at a height of less than 4 m.

As can be seen in FIG. 2, the view from the top of the rotor hub 10 is designed such that three hub outer bodies 16 are arranged in a star-like manner and evenly on the hub core body 12. On the hub outer body 16, the rotor blades (not shown) are connected in a pivotable manner with the hub outer body 16 via corresponding flanges and blade bearings 20.

Furthermore, it can be seen from FIG. 2 that three outer parts in the form of the hub outer bodies 16 are arranged on the hub core body 12. The rotor hub 10, thus, consists of a number of separate bodies or individual components, which are connected with each other during the erection of a wind power plant.

In order to connect the hub outer body 16 with the hub core body 12, a flange 18 is provided between the two bodies so that the two bodies 12 and 16 can be assembled and connected together in a fixed manner. It can be seen in FIG. 1 that the flange connection 18 lies in a plane 22 that is located at a predetermined angle with respect to the rotational axis 24 of the rotor. Plane 22 and rotational axis 24 thereby assume an angle $\alpha$, which is designed as an acute angle. In the geometric sense, the rotational axis 24 breaks through the plane 22 at point P.

According to the invention, all connection flanges or flange connections 18 on the hub core body 12 for the hub outer body 16 are arranged at a predetermined angle with respect to the rotational axis 24 of the rotor.

Due to the fact that the plane 22 is not arranged parallel to the rotational axis 24, it is possible to build the hub core body 12 in a space-saving manner for transport and larger hub core bodies 12 of a rotor hub 10 up to a size of 6 m without creating greater difficulties during transport. It will be possible to produce the hub body 12 in a compact manner due to the inclination of plane 22, in which the flange connection 18 is arranged. Individual pieces are preferably produced in a casting process.

Moreover, FIG. 1 shows a rotor blade axis 26 of a rotor blade (not shown here), which also lies at a predetermined angle with the exclusion of a right angle and an angle area between 85° to 90° with respect to the rotor axis 24.

Furthermore, the flange connection 18 on the hub core body 12 is designed in a circular manner for production reasons, whereby a fixed and stable connection is established between the hub core body 12 and the hub outer body 16.

The hub core body 12 also has an access opening 28 on the outside of the hub core body 12, i.e. on the side facing away from the nacelle of a wind power plant, which is dimensioned such that maintenance personnel can climb into the hub core body 12 designed as a hollow part in order to perform maintenance work. Naturally, it is possible within the framework of the invention to provide an access opening for the maintenance personnel at another point on the rotor hub. For example, the access opening can be designed in an area A of the hub core body 12 marked laterally, which lies close to the connection with the rotor shaft or close to the ring flange 14, or on or in one of the hub outer bodies 16.

The angle α is preferably between plane 22 and rotational axis 24 on the order of magnitude between 10° and 75°. In a preferred embodiment, angle α is ideally greater than 15°, in particular between 15° and 45°. It is hereby possible to achieve a particularly compact design of the hub core body 12 as an individual component in the shape of a cone or tapering body.

FIG. 1 also shows the pitch circle diameters of the flange connections 18 and the flange connection 20 (blade flange connection). This shows that the diameter $D_R$ of the flange connection 20 is greater than the diameter $D_f$ of the flange connection 18 between the hub core body 12 and the hub outer body 16. Moreover, the flange connection 20 is preferably arranged in a plane that is mainly parallel to the rotational axis 24 of the rotor hub 10. For example, the diameter $D_R$ has a size of more than 4 m, in particular more than 4.5 m. The diameter $D_R$ of the flange connection is, thus, greater than the height h of the hub core body 12 with a value of e.g. less than 4 m. Moreover, FIG. 1 shows the front-side construction height B of the hub outer body 16, which is preferably not larger or smaller than the height h of the hub core body 12 and lies e.g. in a range of 2 m to 3 m.

FIG. 2 also shows that the flange connections 18 between the hub core body 12 and the three hub outer bodies 16 are designed evenly on the hub core body. The bore holes of the screw connections on the flange connections 18 are hereby evenly distributed around the circumference so that more screw connections are thereby provided on the flange 18 between the two bodies 12 and 16 than e.g. in the case of oval flanges that are parallel to the rotor axis 24.

In particular the large rotor blade bending moments in the direction of the wind (flapping moments) can thus be particularly safely absorbed.

LIST OF REFERENCES

10 Rotor hub
12 Hub core body
14 Ring flange
16 Hub outer body
18 Flange connection
20 Flange connection
22 Plane
24 Rotational axis
26 Rotor blade axis
28 Access opening
α Angle
A Area
B Construction height
$D_R$ Diameter
$D_f$ Diameter
h Height
P Intersection point

The invention claimed is:

1. A rotor hub of a wind power plant for a rotor comprising a hub core body and a hub outer body that are or will be connected together via a flange connection, wherein the flange connection is constructed with a predetermined tilt angle towards a rotational axis of the rotor, wherein a tilt angle of the flange connection is larger than a tilt angle of the rotor blade connection surface of the hub outer body, and wherein a height of the hub core body is smaller than a diameter of the rotor blade connection surface of the hub outer body.

2. A rotor hub according to claim 1, wherein the flange connection is constructed in a circular manner.

3. A rotor hub according to claim 1, wherein said hub outer body is one of a plurality of hub outer bodies, and wherein several flange connections are provided between the hub core body and said plurality of hub outer bodies.

4. A rotor hub according to claim 1, wherein several flange connections are provided regularly on the hub core body.

5. A rotor hub according to claim 1, wherein the hub outer body is connected with a rotor blade.

6. A rotor hub according to claim 1, wherein the hub outer body and the hub core body are permanently connected together.

7. A rotor hub according to claim 1, wherein an access opening is provided on the hub core body.

8. A rotor hub according to claim 7, wherein the access opening is constructed in an area of the rotor axis on the hub core body.

9. A rotor hub according to claim 1, wherein the hub outer body has a flange connection on the rotor blade side.

10. A rotor hub according to claim 9, wherein the rotor-blade-side flange connection is constructed in a circular manner.

11. A rotor hub according to claim 9, wherein a diameter of the rotor-blade-side flange connection of the hub outer body larger than a diameter of the circular hub-core-body-side flange connection.

12. A wind power plant with a rotor hub according to claim 1.

13. A rotor hub of a wind power plant for a rotor comprising a hub core body and a hub outer body that are or will be connected together via a flange connection, wherein the flange connection is constructed with a predetermined tilt angle towards a rotational axis of the rotor, wherein a tilt angle of the flange connection is larger than a tilt angle of the rotor blade connection surface of the hub outer body, wherein the hub outer body has a flange connection on the rotor blade side, and wherein a diameter of the rotor-blade-side flange connection of the hub outer body is larger than a diameter of the circular hub-core-body-side flange connection.

14. A rotor hub according to claim 13, wherein the flange connection is constructed in a circular manner.

15. A rotor hub according to claim 13, wherein said hub outer body is one of a plurality of hub outer bodies, and wherein several flange connections are provided between the hub core body and said plurality of hub outer bodies.

16. A rotor hub according to claim 13, wherein several flange connections are provided regularly on the hub core body.

17. A rotor hub according to claim 13, wherein the hub outer body is connected with a rotor blade.

18. A rotor hub according to claim 13, wherein the hub outer body and the hub core body are permanently connected together.

19. A rotor hub according to claim 13, wherein an access opening is provided on the hub core body.

20. A rotor hub according to claim 19, wherein the access opening is constructed in an area of the rotor axis on the hub core body.

21. A rotor hub according to claim 13, wherein the rotor-blade-side flange connection is constructed in a circular manner.

22. A wind power plant with a rotor hub according to claim 13.

* * * * *